Figure 1:
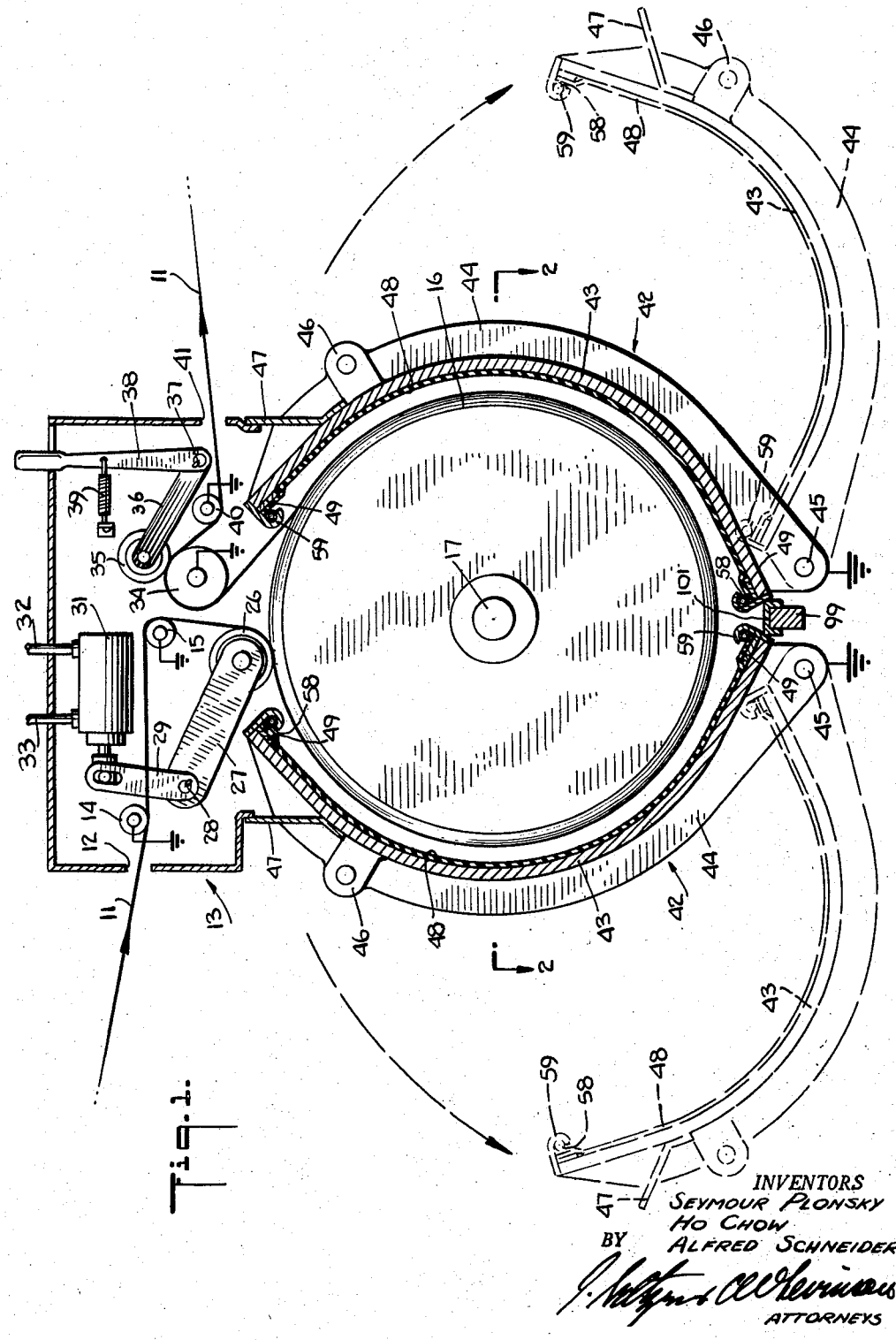

July 22, 1958  S. PLONSKY ET AL  2,844,731
FILM TREATMENT

Filed April 22, 1955  3 Sheets-Sheet 1

INVENTORS
SEYMOUR PLONSKY
HO CHOW
ALFRED SCHNEIDER
BY
ATTORNEYS

INVENTORS
SEYMOUR PLONSKY
HO CHOW
ALFRED SCHNEIDER
BY
ATTORNEYS

July 22, 1958  S. PLONSKY ET AL  2,844,731
FILM TREATMENT

Filed April 22, 1955  3 Sheets-Sheet 3

INVENTORS
SEYMOUR PLONSKY
HO CHOW
ALFRED SCHNEIDER
BY
ATTORNEYS

United States Patent Office 2,844,731
Patented July 22, 1958

2,844,731

FILM TREATMENT

Seymour Plonsky, Elmhurst, and Ho Chow, New York, N. Y., and Alfred Schneider, Belleville, N. J., assignors to Celanese Corporation of America, New York, N. Y., a corporation of Delaware Application April 22, 1955, Serial No. 503,074

23 Claims. (Cl. 250—49.5)

This invention relates to film treatment and relates more particularly to a film treating apparatus for subjecting a film to a high voltage electrical discharge.

It has previously been proposed to subject a film of polyethylene or the like to a high voltage diffuse electrical discharge by passing the same between a pair of suitable spaced electrodes to alter the surface characteristics of the said film so as to impart thereto a receptivity to printing inks or the like. In this process, when the high voltage is applied to the treating electrodes to produce the diffuse electrical discharge, the voltage drop across the gaseous medium between the electrodes will remain substantially constant despite variations in the current through said medium and will depend primarily upon the nature of the gaseous medium, its temperature and pressure. The voltage drop across the polyethylene film, on the other hand, will be proportional to the current flowing therethrough and must be limited to avoid stressing the polyethylene to the point of electrical failure. However, the current should be as high as possible to increase the rapidity of treatment, with the result that high voltages will normally be developed across the polyethylene film. In the event that there are pinholes or other weak spots in the polyethylene film, there is the danger, with such high voltages, that there will be an electrical failure of the polyethylene film producing an arcing-over between the electrodes. The heat generated during such arcing-over will melt or otherwise damage the polyethylene film. In addition, the arcing-over may cause damage to the treating equipment.

To prevent any arcing-over between the electrodes, it has been suggested that there be positioned between the electrodes a sheet of dielectric material, preferably one having a dielectric strength greater than that of the film being treated. When this sheet of dielectric material is first put in place, it serves its purpose quite effectively and prevents any arcing-over between the electrodes. However, as the treatment of the polyethylene film continues, it is found that the diffuse electrical discharge gradually causes a deterioration of the dielectric material so that it becomes unsuited for its intended purpose. Another difficulty which is encountered in positioning the sheet of dielectric material between the electrodes arises from the close spacing normally employed between the electrodes to hold the voltage drop between them to a minimum. Because of such close spacing, the dielectric material must be held perfectly flat, both initially and during the treatment of the polyethylene film, since any buckling or distortion of the dielectric material may bring it into contact with the film being treated so that the said film will be scratched or otherwise damaged. It is difficult, in dealing with commercial size equipment, to hold the sheet of dielectric material with the requisite degree of flatness.

It is an important object of this invention to provide a film treating apparatus for subjecting a film to a diffuse high voltage electrical discharge which will be free from the foregoing and other disadvantages and which will be especially simple in construction and efficient in operation.

A further object of this invention is to provide a film treating apparatus for subjecting a film to a diffuse high voltage electrical discharge in which a sheet of dielectric material may be readily inserted and replaced between the treating electrodes and in which such sheet of dielectric material will be held flat both initially and during the treatment of the film.

Other objects of this invention, together with certain details of construction and combinations of parts, will be apparent from the following detailed description and claims.

According to the present invention, there is provided a pair of electrodes to which a high voltage is applied and between which the film being treated is passed. A sheet of dielectric material is applied to one of the electrodes and vacuum means is provided for exhausting the air from between the electrode and the dielectric material whereby the dielectric material will be pulled firmly against said electrode and held securely in place without buckling or distortion. It is sometimes difficult with such an arrangement to develop a vacuum between the dielectric material and the electrode owing to the irregularities in large size sheets of dielectric material. In such case, means may be provided for pressing the edges of the sheet of dielectric material against the electrode so as to form a good seal and permit the development of a high vacuum therebetween.

It is also desirable to provide means in the apparatus for pressing the film firmly against one of the treating electrodes to insure a good contact therebetween. This insures a uniform treatment of the film and avoids the development of ink-receptivity on the undersurface of the film. In this way the possibility that matter printed on the film will offset is minimized.

In an especially desirable form of the invention, the electrodes have an extended surface area and one of them comprises a rotatable drum onto which the film is pressed. The other electrode comprises a stator encircling the drum and formed of two or more sections that are movable toward and away from the drum to permit access to the surface thereof. The sheet of dielectric material is applied to the stator and may be readily removed and replaced, as desired, without the necessity for breaking the film being treated.

Figure 4:
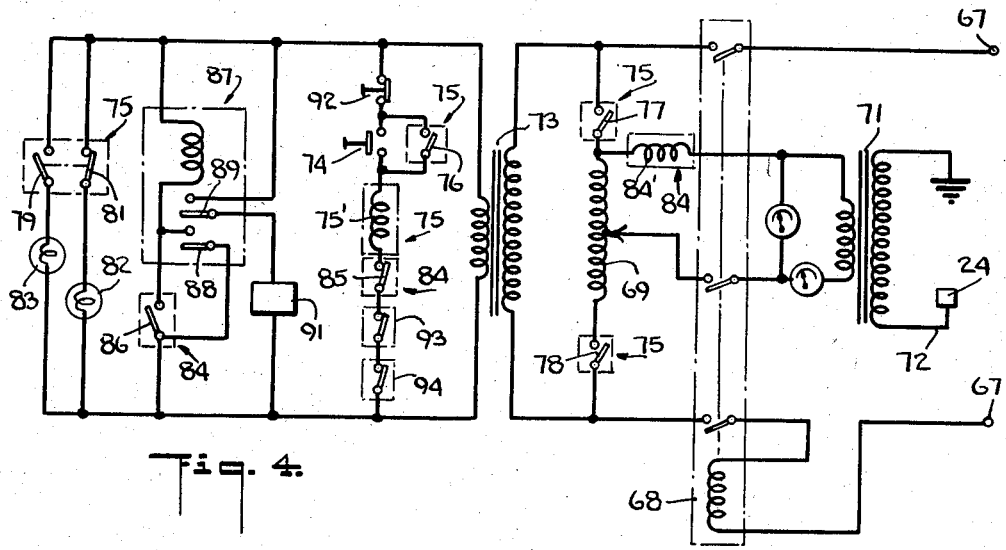
Figure 2:
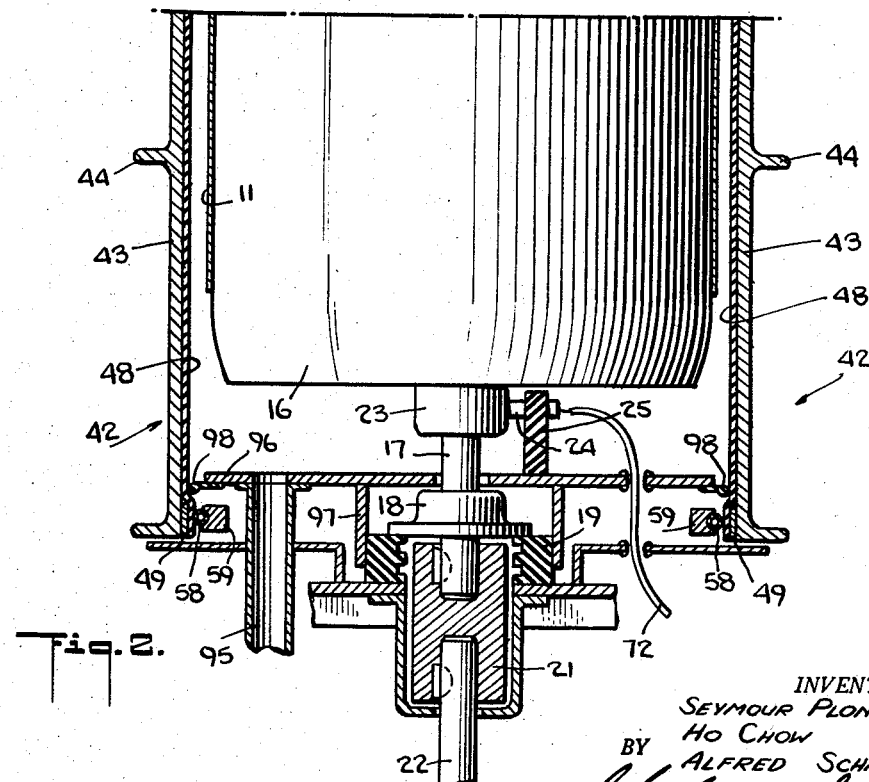
Figure 3:
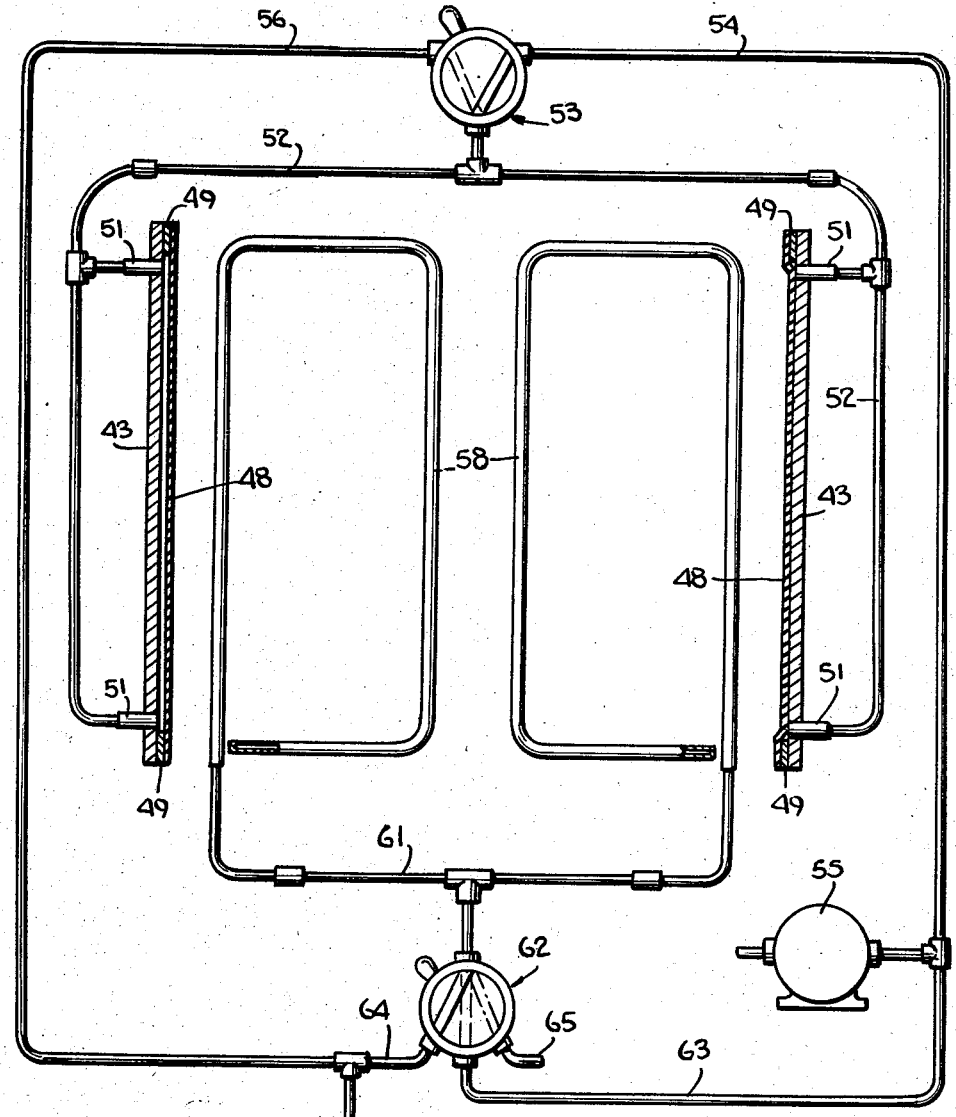
Figure 3:
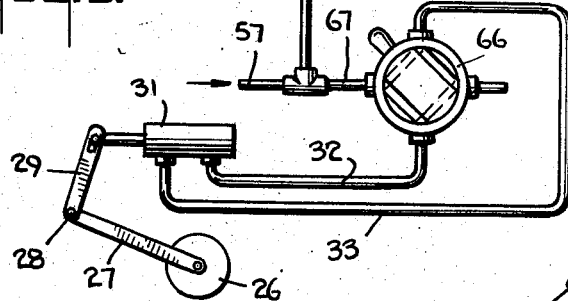

A preferred embodiment of this invention is shown in the accompanying drawings wherein Fig. 1 is an end view, partly in section, of the film-treating apparatus, Fig. 2 is a cross-sectional view, taken on line 2—2 in Fig. 1, in the direction of the arrows, Fig. 3 is a diagrammatic view of the arrangement of the pressure and vacuum lines in the apparatus, and Fig. 4 is a diagram of the electrical circuits in the apparatus.

Referring now to the drawings, the reference numeral 11 designates a polyethylene film which is drawn from any suitable source, not shown, and entered through an opening 12 into a protective enclosure, indicated generally by reference numeral 13. The polyethylene film 11 passes under a grounded, freely rotatable guide roll 14 and over a grounded, freely rotatable guide roll 15 to a treating drum 16 having a smooth, highly finished surface and made of stainless steel, or other corrosion-resistant material. The drum 16 is provided with stub shafts 17 that are journalled rotatably in bearings 18 supported by blocks 19 of electrical insulating material. The two ends of the drum 16 are supported in identical manner, only one such end being shown in the drawings in the interests of brevity. The stub shaft 17 is keyed to one end of a coupling 21 of electrical insulating material and to the other end of said coupling there is keyed a shaft 22 driven from any suitable source, not shown, which rotates the drum 16. Electrical contact is made to the drum 16 through a hub or slip ring 23, fastened to the stub shaft 17, against which bears a brush 24 mounted on a block of insulating material 25.

As the polyethylene film 11 reaches the drum 16, it is pressed firmly against the surface of said drum by means of a freely rotatable roll 26 covered with Neoprene, or other soft, ozone-resistant material and mounted at the lower end of an arm 27 keyed to a shaft 28. Also keyed to the shaft 28 is one end of an arm 29, the other end of which arm is fastened to the operating shaft of an air cylinder 31 to which air or other fluid under pressure can be supplied by means of conduits 32 and 33, as will be described more fully below. By pressing the polyethylene film 11 firmly against the drum 16, all air between said film and said drum is expelled and the formation of air pockets is substantially prevented. This insures that a uniform treatment of the polyethylene film 11 will be achieved and, in addition, prevents treatment of the undersurface of said film. If the undersurface of the polyethylene film 11 is treated and develops a receptivity to printing inks, difficulties may arise during the printing of said film owing to the offsetting of the printing ink to the said undersurface.

The polyethylene film 11 then moves with the drum 16 until it reaches the stripping point where it is drawn from the said drum by means of a positively driven, grounded, metal roll 34, the driving means not being shown, against which the film is pressed by means of a freely rotatable roll 35 covered with Neoprene, or the like. The roll 35 is mounted on an arm 36 keyed to a shaft 37. Also keyed to the shaft 37 is an arm 38 which is biased by means of a spring 39 in a counterclockwise direction to urge the roll 35 firmly against the polyethylene film 11. The end of the arm 38 is shaped to form a handle that extends through the enclosure 13, which handle may, when the said enclosure is removed, be used to move the roll 35 away from the roll 34 when a polyethylene film is being threaded through the apparatus. The polyethylene film 11 then passes under a grounded, freely rotatable, guide roll 40 and is drawn from the enclosure 13 through an opening 41. The treated film may be wound onto a suitable mandrel, or be otherwise treated in any desired manner.

The drum 16 forms one of the treating electrodes. The other electrode comprises a pair of stators, each indicated generally by reference numeral 42. Each stator 42 comprises a generally hemi-cylindrical shell 43 provided with stiffening ribs 44 for structural rigidity and pivotally mounted at its lower end on a shaft 45. The shell 43 is generally concentric with the drum 16 over the major portion of its periphery, but is shaped so that its upper and lower edges are spaced somewhat further from the said drum than the remainder thereof. In this way, the tendency for sparking over to occur between the two electrodes is minimized. Further to minimize the tendency toward sparking, the ends of the drum 16 are rounded as shown in Fig. 2 of the drawings. The stators 42 are each provided with handles 46 whereby they may be readily moved from operating position, as shown in full lines in Fig. 1 of the drawings, to a position for threading the polyethylene film 11 through the apparatus and for changing the dielectric material, as shown in broken lines in said figure of the drawings. In addition, each stator 42 is provided with upstanding members 47 on which the enclosure 13 rests and which form with said enclosure and said stators a substantially complete shield for preventing accidental contact of the person of the operative with the high voltages applied between the electrodes.

A sheet of dielectric material 48 covers the inner surface of each shell 43 and is held evenly against said surface by means of a vacuum between the said dielectric material and the said shell. To develop the said vacuum, a gasket 49 is secured around the entire periphery of each shell 43 and there are provided a plurality of conduits 51 (Fig. 3) extending through said shell at points in the area bounded by the gasket 49. The conduits 51 are connected by means of lines 52 and a two-way valve, indicated generally by reference numeral 53, to a line 54 leading to a vacuum pump 55. The dielectric material is cut to a size to fit the inner surface of the shell 43 and is positioned against said shell with its edges resting on the gasket 49 as shown in the left-hand portion of Fig. 3 of the drawings. The pump 55 will then exhaust the air from between the dielectric material 48 and the shell 43 whereby atmospheric pressure will force the dielectric material into contact with the inner surface of shell 43, as shown in the right-hand portion of Fig. 3 of the drawings. The applied vacuum will hold the dielectric material 48 securely in place without buckling or distortion, either initially or after use. When it is desired to remove the sheet of dielectric material 48, it is sometimes found that the said sheet will adhere tenaciously to the shell 43 even after the vacuum has been cut off. To assist in removing the dielectric material 48 in such case, the valve 53 is turned to the position shown in broken lines in Fig. 3 of the drawings to connect the lines 52 to a line 56 leading to a source of compressed air 57. The compressed air will blow the dielectric material 48 free of the shell 43 whereby its removal may be readily effected.

In some cases, it is found that considerable difficulty is experienced in first pulling the sheet of dielectric material 48 against the shell 43 through the use of vacuum owing to the many openings that exist between the gasket 49 and the said sheet whereby air can flow through said openings at a rate faster than it can be drawn away by the vacuum pump 55. To assist in obtaining an initial seal between the sheet of dielectric material 48 and the gasket 49, there is provided a length of flexible tubing 58 mounted on brackets 59 that extend around the entire periphery of the shell 43. The tubing 58 is aligned with the gasket 49 and is spaced therefrom a distance to permit the placing therebetween of the dielectric material 48 when the said tubing is collapsed as will be described more fully below. One end of the tubing 58 is closed and the other end of said tubing is connected by means of a line 61 to a three-way valve 62. When a sheet of dielectric material 48 is being positioned in the apparatus, the valve 62 is operated to connect the line 61 to a line 63 leading to the vacuum pump 55 whereby the tubing 58 will be collapsed and sufficient space will be opened between the said tubing and the gasket 49 to permit the edges of the dielectric material to be positioned in said space readily. Thereafter, the valve 62 is operated to connect the line 61 to a line 64 leading to the supply of compressed air 57. The compressed air will expand the tubing 58 clamping the edges of the sheet of dielectric material firmly against the gasket 49 and preventing the leakage of air therebetween. When the valve 53 is operated to apply a vacuum between the dielectric material 48 and the shell 43, there will be no difficulty in exhausting all the air from between said elements. After the dielectric material 48 has been pulled up against the shell 43, the valve 62 is operated to connect the line 61 to the line 65 leading to the atmosphere whereby all pressure will be removed from the tubing 58 and it will be in an unstressed state.

Fig. 3 of the drawings shows the arrangement for operating the air cylinder 31, which arrangement includes a two-way valve 66 to which are connected the conduits 32 and 33. The valve 66 is connected through a line 67 to the compressed air line 57 and may be operated to supply compressed air to one or the other of the conduits 32 and 33. When compressed air is supplied to the conduit 33 it will act to urge the roll 26 toward the drum 16. On the other hand, when compressed air is supplied to the conduit 32, the roll 26 will be lifted away from the drum 16 to permit the polyethylene film 11 to be threaded through the apparatus.

The electrical circuit for supplying a high voltage to the apparatus is shown in Fig. 4 of the drawings and includes terminals 67 to which an alternating current voltage is applied. Current flows from the terminals 67 through a circuit breaker 68 to a variable autotransformer 69 and from said autotransformer to a high voltage transformer 71, one end of the output of which is grounded and the other end of the output of which is connected through an insulated lead 72 to the brush 24. Current also flows from the terminals 67 to a step-down transformer 73 which supplies power for the control and safety circuits. These circuits include a starting button 74 which, when operated, causes current to flow through a multi-contact relay, indicated generally by reference numeral 75, and having an actuating coil 75'. When the relay 75 is energized, it will close contact 76 connected in parallel with starting button 74 so that current will continue to flow through said relay after the starting button is released. It will also close contacts 77 and 78 permitting current to flow to the autotransformer 69. Finally it will simultaneously close contact 79 and open contact 81, turning out green pilot light 82 and turning on red pilot light 83. Under these conditions there will be a supply of high voltage to the apparatus. In the event that excessive current flows, even momentarily, to the high voltage transformer 71, it is desirable to cut off the current to said transformer to avoid damage thereto and to the treating apparatus. To this end, there is provided an instantaneous overload relay, indicated generally by reference numeral 84 and having an actuating coil 84', which, on operation, opens the contact 85, de-energizing the relay 75 and disconnecting power from the autotransformer 69. Operation of the relay 84 also closes contact 86 energizing the relay, indicated generally by reference numeral 87, thereby closing contact 88 in parallel with contact 86 so that the relay 87 will remain energized even after contact 86 has opened. Contact 89 is also closed when the relay 87 is energized actuating an alarm 91. The entire circuit is cut off by manually opening circuit breaker 68, which circuit breaker will, of course, also open in the event of a short. There is provided a manual stop button 92 in series with the relay 75 to permit the high voltage to be cut off whenever desired. As a safety measure to prevent accidental application of high voltage to the drum 16 when the stators 42 are open, switches 93 and 94 are positioned to be closed only when the said stators are closed and are connected in series with the relay 75.

The grounded rolls 14, 15, 34 and 40, over which the polyethylene film 11 passes on entering and leaving the apparatus of this invention, constitute an additional safety feature in preventing flow of current along the film. Such flow may occur if the surfaces of the film acquire a conductive layer, for example, of water thereon. It should be noted that the grounded rolls contact both sides of the film.

During the operation of the apparatus of this invention, ozone is generated by the electrical discharge passing through the air. Since ozone represents a hazard owing to its toxicity, means are provided for safely removing the ozone from the apparatus. Such means include an exhaust duct 95 connected to a vent fan, not shown, which duct extends through a plate 96 supported on a ring 97 secured to the block 19. The edges of the plate 96 are provided with a gasket 98 that bears against the dielectric material 48 when the stators 42 are closed to form a substantially air-tight seal therewith. In addition, the space between the lower edges of the stators 42 is closed by means of a strip 99 covered with a layer of gasket material 101 positioned therebetween. During operation, air will be drawn continuously into the apparatus through all openings therein and, together with the ozone formed, will flow into the duct 95 and be discharged therefrom to a safe place.

It is to be understood that the foregoing detailed description is merely given by way of illustration and that many variations may be made therein without departing from the spirit of our invention.

Having described our invention, what we desired to secure by Letters Patent is:

1. Apparatus for subjecting a film to a high voltage electrical discharge, comprising a pair of electrodes between which the film is passed, a sheet of dielectric material positioned on the face of one of said electrodes and between said electrodes, means permanently secured to said one electrode for pressing the edges of the sheet of dielectric material against the electrode, and means for applying a lower pressure between the sheet of dielectric material and the electrode than the pressure on the other side of said sheet whereby the dielectric material is held firmly against said electrode.

2. Apparatus for subjecting a film to a high voltage electrical discharge, comprising a pair of electrodes between which the film is passed, a sheet of dielectric material positioned on the face of one of said electrodes and between said electrodes, pressure application means for pressing the film being treated firmly against one of the electrodes by the application of pressure on said film between said pressure application means and said electrode, and means whereby the dielectric material is held releasably and firmly against said electrode.

3. Apparatus for subjecting a film to a high voltage electrical discharge, comprising a pair of electrodes between which the film is passed, one of said electrodes being grounded and enclosing the major portion of the periphery of the other electrode, means whereby a sheet of dielectric material is releasably and firmly held against the said one electrode and out of contact with the other electrode, and means for pressing the film being treated firmly against one of the electrodes.

4. Apparatus for subjecting a film to a high voltage electrical discharge comprising a pair of electrodes including a first electrode adapted for continuous movement of its face in a surface at a fixed distance from the face of the other electrode, a second grounded electrode of a width at least as great as the first electrode and substantially completely enclosing the first electrode, said electrodes being separated by a space through which the film is passed, a sheet of dielectric material being firmly and releasably held between said electrodes on the face of one of said electrodes and out of contact with the other electrode.

5. Apparatus for subjecting a film to a high voltage electrical discharge, comprising a rotatable drum, a grounded stator enclosing said drum and spaced therefrom, said drum and said stator forming a pair of electrodes between which the film is passed, a sheet of dielectric material positioned between said electrodes and on the face of said stator, and means whereby the dielectric material is held firmly and releasably against said stator.

6. Apparatus for subjecting a film to a high voltage electrical discharge, comprising a rotatable drum, a stator enclosing said drum and spaced therefrom, said drum and said stator forming a pair of electrodes between which the film is passed, a sheet of dielectric material positioned between said electrodes and on the face of said stator, means secured to said stator for releasably pressing the edges of the sheet of dielectric material against said stator, and means for applying a lower pressure between the sheet of dielectric material and the stator than on the opposite side of said sheet whereby the dielectric material is held firmly against said stator.

7. Apparatus for subjecting a film to a high voltage electrical discharge, comprising a rotatable drum, a grounded stator substantially completely enclosing said drum and spaced therefrom, said drum and said stator forming a pair of electrodes between which the film is passed, means whereby a sheet of dielectric material is releasably and firmly held between said electrodes against said stator and out of contact with said drum, and means for pressing the film being treated firmly against the drum.

8. Apparatus for subjecting a film to a high voltage electrical discharge, comprising a rotatable drum, a grounded stator of a width at least as great as that of the drum and enclosing the major portion of the periphery of said drum and spaced therefrom, said drum and said stator forming a pair of electrodes between which the film is passed, and grounded rolls for guiding the film being treated in its passage between the electrodes.

9. Apparatus for subjecting a film to a high voltage electrical discharge, comprising a rotatable drum, and a stator formed of a plurality of sections movable toward and away from said drum enclosing said drum and spaced therefrom, means whereby a sheet of dielectric material is releasably and firmly held against each section of said stator and out of contact with said drum, said drum and said stator forming a pair of electrodes between which the film is passed.

10. Apparatus for subjecting a film to a high voltage electrical discharge comprising a rotatable drum, a plurality of electrodes mounted for movement toward and away from said drum forming a stator enclosing the major portion of the periphery of said drum and separated therefrom by a space within which the film is passed, sheets of dielectric material positioned on said stator and means releasably holding the dielectric materials firmly against the face of said stator.

11. Apparatus for subjecting a film to a high voltage electrical discharge, comprising a pair of electrodes between which the film is passed, a housing generally enclosing said electrodes, and means for exhausting air from said housing whereby air will flow into and through said housing to said exhaust means carrying with it the ozone generated by the electrical discharge.

12. Apparatus for subjecting a film to a high voltage electrical discharge, comprising a rotatable drum, a pair of hemi-cylindrical shells pivotally mounted at one end for movement toward and away from said drum forming a stator enclosing said drum and spaced therefrom, said drum and said stator forming a pair of electrodes between which the film is passed, sheets of dielectric material positioned on said hemi-cylindrical shells, and conduits extending through said shells for applying a vacuum between the sheets of dielectric material and the shells whereby the dielectric materials are held firmly against said shells.

13. Apparatus for subjecting a film to a high voltage electrical discharge, comprising a rotatable drum, a pair of hemi-cylindrical shells pivotally mounted at one end for movement toward and away from said drum forming a stator enclosing said drum and spaced therefrom, said drum and said stator forming a pair of electrodes between which the film is passed, gaskets extending around the periphery of the inner surface of said hemi-cylindrical shells, sheets of dielectric material positioned on said gaskets, conduits extending through said shells for applying a vacuum between the sheets of dielectric material and the shells whereby the dielectric materials are held firmly against said shells.

14. Apparatus for subjecting a film to a high voltage electrical discharge, comprising a rotatable drum, a pair of hemi-cylindrical shells pivotally mounted at one end for movement toward and away from said drum forming a stator enclosing said drum and spaced therefrom, said drum and said stator forming a pair of electrodes between which the film is passed, gaskets extending around the periphery of the inner surface of said hemi-cylindrical shells, sheets of dielectric material positioned on said gaskets, conduits extending through said shells for applying a vacuum between the sheets of dielectric material and the shells whereby the dielectric materials are held firmly against said shells, tubing aligned with said gaskets and spaced therefrom to permit the edges of the dielectric materials to be inserted between the gasket and the tubing, and means for applying pressure to the tubing to expand said tubing and clamp the edges of said dielectric materials between the tubing and the gasket.

15. Apparatus for subjecting a film to a high voltage electrical discharge, comprising a rotatable drum, a pair of hemi-cylindrical shells pivotally mounted at one end for movement toward and away from said drum forming a stator enclosing said drum and spaced therefrom, said drum and said stator forming a pair of electrodes between which the film is passed, gaskets extending around the periphery of the inner surface of said hemi-cylindrical shells, sheets of dielectric material positioned on said gaskets, conduits extending through said shells for applying a vacuum between the sheets of dielectric material and the shells whereby the dielectric materials are held firmly against said shells, tubing aligned with said gaskets and spaced therefrom to permit the edges of the dielectric materials to be inserted between the gasket and the tubing, means for applying pressure to the tubing to expand said tubing and clamp the edges of said dielectric materials between the tubing and the gasket, and grounded rolls for guiding the film being treated toward and away from said drum.

16. Apparatus for subjecting a film to a high voltage electrical discharge, comprising a rotatable drum, a pair of hemi-cylindrical shells pivotally mounted at one end for movement toward and away from said drum forming a stator enclosing said drum and spaced therefrom, said drum and said stator forming a pair of electrodes between which the film is passed, gaskets extending around the periphery of the inner surface of said hemi-cylindrical shells, sheets of dielectric material positioned on said gaskets, conduits extending through said shells for applying a vacuum between the sheets of dielectric material and the shells whereby the dielectric materials are held firmly against said shells, tubing aligned with said gaskets and spaced therefrom to permit the edges of the dielectric materials to be inserted between the gasket and the tubing, means for applying pressure to the tubing to expand said tubing and clamp the edges of said dielectric materials between the tubing and the gasket, grounded rolls for guiding the film being treated toward and away from said drum, a roll for pressing said film against said drum, and means releasably urging said pressure roll toward said drum.

17. Apparatus for subjecting a film to a high voltage electrical discharge, comprising a rotatable drum, a pair of hemi-cylindrical shells pivotally mounted at one end for movement toward and away from said drum forming a stator enclosing said drum and spaced therefrom, said drum and said stator forming a pair of electrodes between which the film is passed, gaskets extending around the periphery of the inner surface of said hemi-cylindrical shells, sheets of dielectric material positioned on said gaskets, conduits extending through said shells for applying a vacuum between the sheets of dielectric material and the shells whereby the dielectric materials are held firmly against said shells, tubing aligned with said gaskets and spaced therefrom to permit the edges of the dielectric materials to be inserted between the gasket and the tubing, means for applying pressure to the tubing to expand said tubing and clamp the edges of said dielectric materials between the tubing and the gasket, grounded rolls for guiding the film being treated toward and away from said drum, a roll for pressing said film against said drum, means releasably urging said pressure roll toward said drum, a housing forming with said stators an enclosure for said drum, and a duct extending through said housing for exhausting air from said housing and from between said stator and said drum whereby air will flow into and through said space to said exhaust duct carrying with it the ozone generated by the electrical discharge.

18. Apparatus for subjecting a film to a high voltage electrical discharge, comprising a rotatable drum, a pair of hemi-cylindrical shells pivotally mounted at one end for movement toward and away from said drum forming a stator enclosing said drum and spaced therefrom, said drum and said stator forming a pair of electrodes between which the film is passed, gaskets extending around the periphery of the inner surface of said hemi-cylindrical shells, sheets of dielectric material positioned on said gaskets, conduits extending through said shells for applying a vacuum between the sheets of dielectric material and the shells whereby the dielectric materials are held firmly against said shells, means for applying pressure to said conduits to separate said sheets of dielectric material from said shells, tubing aligned with said gaskets and spaced therefrom to permit the edges of the dielectric materials to be inserted between the gasket and the tubing, means for applying pressure to the tubing to expand said tubing and clamp the edges of said dielectric materials between the tubing and the gasket, means for applying a vacuum to said tubing to collapse said tubing, grounded rolls for guiding the film being treated toward and away from said drum, a roll for pressing said film against said drum, means releasably urging said pressure roll toward said drum, a housing forming with said stators an enclosure for said drum, and a duct extending through said housing for exhausting air from said housing and from between said stator and said drum whereby air will flow into and through said space to said exhaust duct carrying with it the ozone generated by the electrical discharge.

19. Apparatus for subjecting a film to a high voltage electrical discharge comprising a rotatable drum tapered at its ends, a fixed electrode of a width at least as great as the drum, said fixed electrode enclosing at least the major portion of the periphery of the drum, and a sheet of dielectric material firmly and releasably held flatly to said fixed electrode and out of contact with said drum, said sheet substantially completely covering the face of the fixed electrode adjacent the drum.

20. Apparatus for subjecting a film to a high voltage electrical discharge comprising a pair of electrodes separated by a space through which the film is passed, a sheet of dielectric material positioned between said electrodes and releasably held on the face of one of said electrodes, means for supplying a fluid pressure between the sheet of dielectric and said one electrode greater than the fluid pressure on the other side of said sheet whereby to readily remove said sheet from said electrode, and means for leading said film between said electrodes.

21. Apparatus for subjecting a film to a high voltage electrical discharge comprising a pair of electrodes separated by a space through which the film is passed, one of said electrodes being adapted for continuous movement of its face in a surface at a fixed distance from the face of the other electrode, a sheet of dielectric material releasably held between the electrodes on the face of one of the electrodes, and means for supplying a fluid pressure between the sheet of dielectric and said one electrode greater than the fluid pressure on the other side of said sheet whereby to readily remove said sheet from said electrode.

22. Apparatus for subjecting a film to a high voltage electrical discharge comprising a first electrode, and a grounded electrode adjacent to and substantially completely enclosing said first electrode and separated therefrom by a space through which the film is passed.

23. Apparatus for subjecting a film to a high voltage electrical discharge comprising a first electrode, a grounded electrode adjacent to and substantially completely enclosing said first electrode and separated therefrom by a space through which the film is passed, and means for leading said film between said electrodes.

References Cited in the file of this patent

UNITED STATES PATENTS

| | | |
|---|---|---|
| 2,074,335 | Kelley | Mar. 23, 1937 |
| 2,477,808 | Jones | Aug. 2, 1949 |

FOREIGN PATENTS

| | | |
|---|---|---|
| 510,068 | Belgium | Apr. 15, 1952 |